Figure 1:
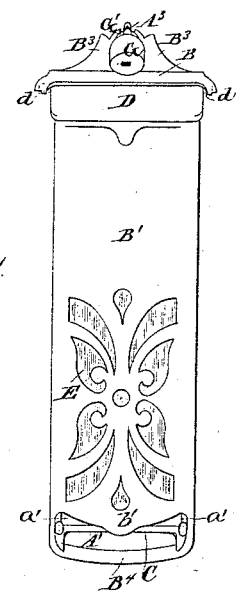

(No Model.)

O. E. MILES.
MAIL BOX.

No. 328,046. Patented Oct. 13, 1885.

Witnesses
Charles R. Searle
J. E. Renwick

Inventor
Oren E. Miles
by his attorney
Thomas Drew Stetson

UNITED STATES PATENT OFFICE.

OREN E. MILES, OF DAVENPORT, IOWA.

MAIL-BOX.

SPECIFICATION forming part of Letters Patent No. 328,046, dated October 13, 1885.

Application filed October 13, 1884. Serial No. 145,339. (No model.)

*To all whom it may concern:*

Be it known that I, OREN E. MILES, of Davenport, Scott county, in the State of Iowa, have invented certain new and useful Improvements in Mail-Boxes, of which the following is a specification.

My invention may apply to mail-boxes in post-offices and various other situations. My boxes may be used on lamp-posts or the like to receive the mail-matter from any parties and hold it till the mail-carrier arrives to take it and place it in the mail; but it is intended mainly for use to receive the mail-matter for a private individual, firm, or corporation from the mail-carrier, stage-driver, or private parties who may come in the vicinity. Boxes for this purpose have been long used. They allow the matter to be deposited in them without delay.

The box may be fastened to the door or other portion of a dwelling-house, store, manufactory, or the like, or it may be secured to a tree, fence-post, or any other suitable object, either out of doors or under a shed or within any building.

My box may be cheaply and durably made. It may, where the quantity of mail-matter to be received is presumably small, be made of small horizontal dimensions, but with a depth sufficient to accommodate the longest letters, newspapers, or the like. The construction allows the mail-matter to be removed from such box without the necessity of thrusting the hand down any impracticable aperture and without risk of losing any letters or other article out sidewise, even when the box is opened in a high wind or other disadvantageous circumstances.

A good material for the box is cast-iron defended by enamel, japan, or paint or other sufficient protection against oxidation in any weather.

The following is a description of what I consider the best means of carrying out the invention: I screw or otherwise secure one part against a post or other upright object. The front, the two sides, and the top, except the lid, are formed in one piece, or in two or more pieces, which may be rigidly secured together to serve as one piece. This part is hinged to the fixed part. The box opens by swinging the front and sides forward. The bottom is formed in one with the back-piece. The back is also provided with wings, near the bottom, which avoid the presentation of any open joint at the bottom on either side when the movable part is inclined forward. The ordinary small aperture at the top to receive the mail-matter is protected by a weatherproof lid, and the front is made in part openwork and equipped with glass to show the contents.

The accompanying drawings form a part of this specification.

Figure 3:
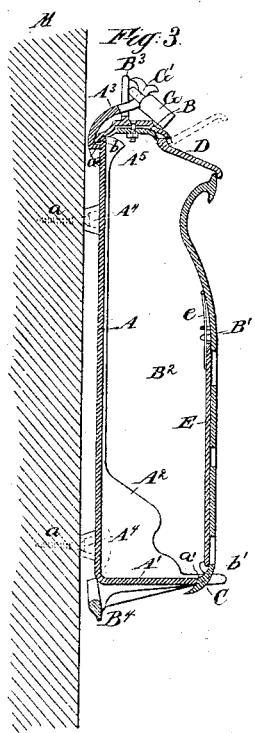
Figure 2:
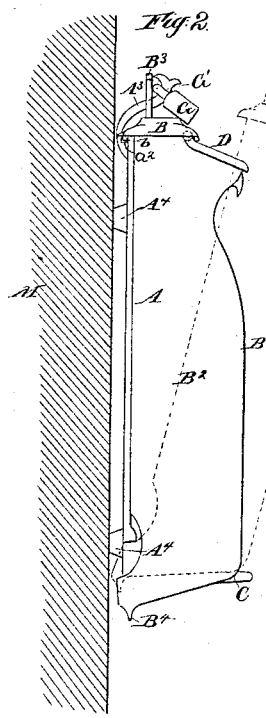
Figure 4:
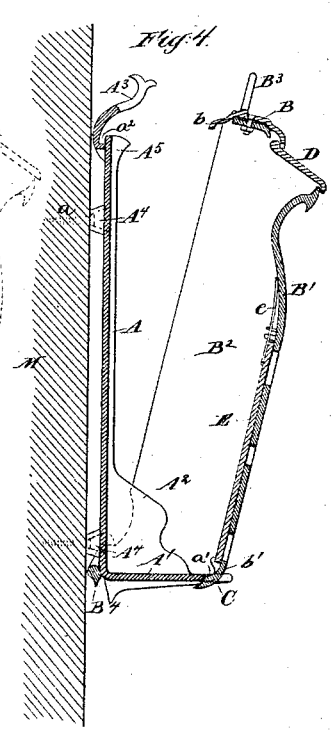

Figure 1 is a front elevation of the box. Fig. 2 is a side elevation. The dotted lines show the box open. Figs. 3 and 4 are vertical central sections through the box. Fig. 3 shows the box closed, and Fig. 4 shows the box in an open condition.

Similar letters of reference indicate corresponding parts in all the figures where they occur.

M is a fence-post, forming a reliable support for my box.

A is a casting, certain portions of which will be designated, when necessary, by additional marks, as $A'$ $A^2$. The main portion A is secured to M by wood-screws $a$, the heads of which are sunk in boxes $A^4$. A horizontal extension, $A'$, from the base of A serves as the bottom of the box. A wing, $A^2$, on each side aids to defend the contents against falling out when the box is opened. The front edge, $a'$, of $A'$ is adapted to form half of a peculiar rolling joint.

B is the turning portion, certain parts being designated, when necessary, by additional marks, as $B'$ $B^2$. The top is marked simply B. The main vertical portion forming the front of the box is marked $B'$. The extreme bottom is formed, as indicated by $b'$, to match with the part $a'$ of the bottom $A'$, and so as by rolling one part upon the other to constitute a strong and reliable joint, which I will designate, when necessary, as the joint C.

Two catches, $A^5$, are provided in the interior near the top. Each has an inclined face, which causes the part B to rise near the termination of its closing motion and drop into a notch when fully closed.

D is a hinged lid secured to B by pins or rivets $d$. The fixed top B overhangs a part of the lid D and prevents the latter being lifted above a proper amount. This prevents fraudulent abstraction of the contents.

An arm, $A^3$, extends upward from A. Its middle height stands considerably forward, but its upper end is bent backward.

$B^3 B^3$ are uprights cast in one piece with the part B.

The box is closed by tilting the part B back into tight connection with the part A. In this position the wings $B^2$ of the part B embrace the edges of the part A and fit closely thereto. The part $A^3$ extends forward through the space between the parts $B^3$, and by the curvature of $A^3$ forms an opening which may receive an ordinary curved locking-bar, $G'$, of the padlock G. The curvature of the arm $A^3$ and its relation to the arms $B^3$ forbid the removing of the padlock, except by unlocking with a key, and thus liberating the locking-bar $G'$.

An internal lip, $b$, at the back edge of the top B engages with the catch $a^2$ when the box is closed and holds the joint tight. To disengage this lip $b$ from the catches $a$, it is necessary simply to lift the part B a little after the padlock is removed.

Operation: The box being closed and locked, the mail-carrier or other person lifts the lid D, introduces through the aperture any letter or other mail-matter, which, being flexible, readily bends and descends into the lower portion of the box. On dropping the lid the aperture is defended against weather.

To open the box, the operator unlocks and removes the padlock G, and then applies sufficient force to turn the part B forward on its joint C. This joint being at the outer or front edge of the bottom, gravity holds the part B closed until a slight force is exerted to open it. The swinging forward of the part B opens the upper portion sufficiently to allow the hand to be inserted so that the fingers may reach to the bottom; but the wings $A^2$, standing just within the wings $B^2$, maintain a complete wall and keep the side apertures closed near the bottom, so that letters cannot tumble out sidewise or be removed by wind. The contents being removed, the box is again closed tightly by simply pressing the part B backward, and is secured by reapplying the padlock and locking. The back edge of each wing $B^2$ extends considerably below the back edge of the inclosed wings $A^2$. A cross-bar, $B^4$, joins the lower back corners of these wings $B^2$, and serves as a stop, by striking against the bottom $A'$, to hold the part B against moving forward too far when the box is opened. The front of $B'$ is made open-work near the bottom, the apertures being covered by a plate of glass, E. The glass is secured by a spring, $e$. It may be further secured by putty. All the joints should be made as tight as practicable, so as to exclude rain and snow.

Modifications may be made in the forms and proportions within wide limits. It is not essential to contract the dimensions of the box near the top, as shown, but I prefer to do so. Instead of open-work and glass, the front may be a tight casting.

Parts of the invention may be used without the whole. Some of the advantages of the invention may be realized without the stop $B^4$.

I can dispense with the catches $a$ and with the lip $b$; but I esteem them important in holding the parts firmly and tightly together independent of the securing which is effected by the padlock. The peculiar rolling joint C is important in allowing the part B to rise and sink in engaging with the catch and in being disengaged therefrom.

I claim as my invention—

1. A mail-box having the main body hinged at C, and formed with a wing, $B^2$, at each side fitting tightly against a back piece, in combination with a back piece, A, having wings $A^2$, forming lateral walls co-operating with the wings, to keep the bottom closed when the box is opened, as herein specified.

2. In a mail-box, the front movable portion, $B'$, having wings $B^2$, and stop $B^4$, turning on a hinge, C, at or near the front edge of the bottom, in combination with a fixed part, A, having a bottom, $A'$, and wings $A^2$, the wings co-operating to keep the bottom closed when the box is opened, as herein specified.

In testimony whereof I have hereunto set my hand at Rock Island, Illinois, this 22d day of September, 1884, in the presence of two subscribing witnesses.

OREN E. MILES.

Witnesses:
   HENRY C. CONNELLY,
   CHAS. C. CARTER.